C. E. COOK.
SHOOTING GLASSES.
APPLICATION FILED JUNE 19, 1909.
936,987.
Patented Oct. 12, 1909.
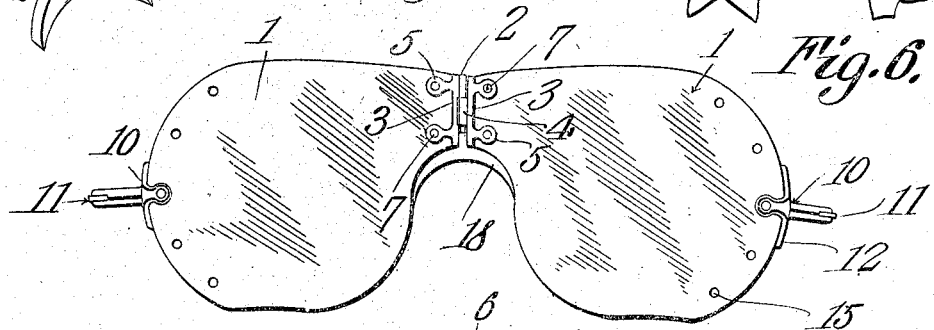
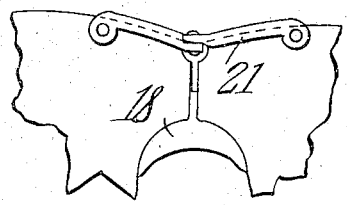
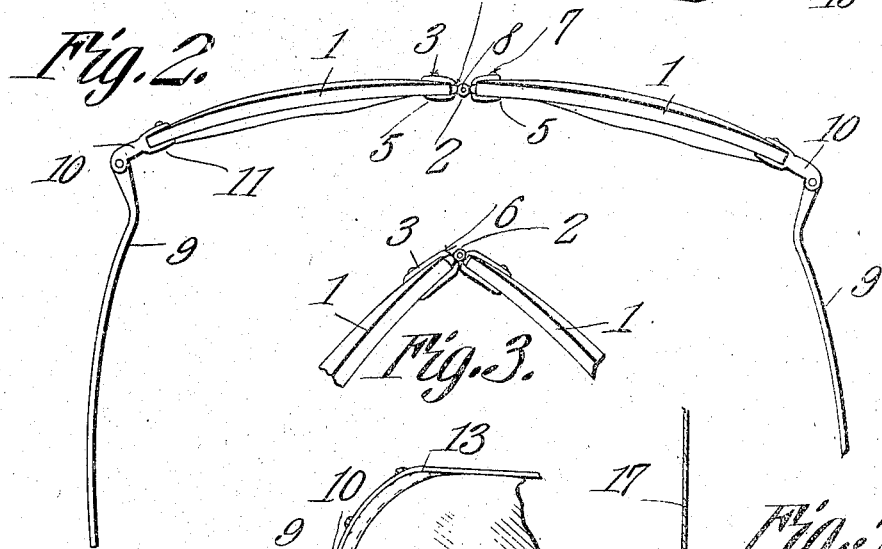
Witnesses
Inventor
Carroll E. Cook.
By
Attorneys

UNITED STATES PATENT OFFICE.

CARROLL E. COOK, OF NEW LONDON, IOWA.

SHOOTING-GLASSES.

936,987.      Specification of Letters Patent.      Patented Oct. 12, 1909.

Application filed June 19, 1909. Serial No. 503,220.

*To all whom it may concern:*

Be it known that I, CARROLL E. COOK, a citizen of the United States, residing at New London, in the county of Henry and State of Iowa, have invented new and useful Shooting-Glasses, of which the following is a specification.

My present invention relates to shooting glasses and automobile goggles, and seeks to provide certain improvements in glasses of the type shown in Letters Patent, granted to me March 23, 1909, Number 916,109.

One object of the present invention is to provide a hinge which will permit the glasses to be folded sufficiently to be carried in the pocket and at the same time will prevent them coming together so as to be broken by the contact.

A further object of the invention is to provide an improved means of supporting the glasses and securing an eye shield or hood thereto.

The invention consists in certain peculiar features of construction which will be hereinafter set forth and specifically pointed out in the claims.

In the annexed drawings, which fully illustrate my invention, Figure 1 is a front elevation of a pair of glasses fitted with my improved hinge. Fig. 2 is a plan view of the same, showing the glasses in the open position. Fig. 3 is a similar view, showing the glasses closed. Fig. 4 is a detail front elevation of the reinforcing rim and shield securing device. Fig. 5 is a detail section view, taken on the line 5—5 of Fig. 4. Fig. 6 is a detail view showing a modified form of hinge. Fig. 7 is a detail view of a supplemental nose bridge.

The lenses 1 are of the same shape, or a very similar shape, as the lenses shown in my aforesaid patent. At the inner meeting edges of the lenses, above the nose opening therein, I provide the hinge 2, consisting of lens-engaging members 3, each of which comprises a sleeve 4 and a pair of perforated lugs or ears 5 projecting from the said sleeve. The lugs or ears 5 do not extend radially from the sleeve but are carried tangentially to opposite sides of the said sleeve so as to provide shoulders 6 and are then turned back in parallel planes so as to fit against the front and rear faces of the lens. The lenses are secured by means of rivets 7, inserted through the perforated lugs or ears 5, and the hinge members are connected by means of a pivot pin 8, inserted through the sleeves 4 of the respective members, it being understood that the sleeves are adapted to register and receive the pivot pin.

It will be readily understood that the construction of hinge thus set forth will permit the glass lenses to be opened to the position shown in Fig. 2, and also to be placed in any partly opened position so as to accommodate variations in the formation of the foreheads of different users and also to aid in remedying defects of vision, as shown in Fig. 3, but will be prevented from being pushed against each other by reason of the shoulders of the hinge members coming into contact, as shown in Fig. 3. Liability of the lenses to be snapped or cracked by violent closing or collapsing of the same due to careless handling is thus overcome. The construction of hinges devised by me furnishes a strong connection for large lenses without offering any obstruction to the vision.

The lenses are held in position in front of the eyes of the user by means of temples 9, which are pivoted at their front ends to outstanding lugs 10 of reinforcing frames 11 which are riveted to the outer edges of the lenses and are provided with the curved bodies or braces 12 conforming to the curvature of the edge of the lens. In this manner the lenses may be held against dropping without binding upon the nose of the wearer or otherwise causing him any inconvenience, it being understood that the temples 9 are carried back to hook over the wearer's ears in the usual manner. When the lenses are to be utilized in automobile goggles, the braces 12 of the frames 11 are extended upward and downward, so as to cover the entire end edges of the lenses as shown in Fig. 4, and are constructed with a plurality of lugs or ears 13 which are adapted to be riveted to the lenses. The rivets or pins 14 are inserted through the lugs or ears and perforations 15 in the lenses and their inner ends are then bent against the inner ears to secure the parts together and at the same time permit their ready separation for repairs or other purposes. The reinforcing frames are provided on their outer sides with a number of perforated projections 16 to which the edge of a hood or eye-shield 17 is secured by stitching. In this manner I provide a light and secure fastening for the eye-shield or hood, which will not detract from the sightliness of the glasses nor augment the weight imposed upon the nose or ears of the user in supporting the glasses. The shield can be easily removed when it is desired to renew or repair the same by merely cutting the stitches, and it will be readily understood that this same manner of fastening the hood or shield may be employed with the ordinary automobile goggles in which the lenses are both in one piece of glass.

In order to protect the nose against possible injury from the edges of the lenses, I utilize a supplemental bridge, 18, of rubber or similar material having a crescent-shaped base 19 to fit in the apex of the nose-opening, and from which a central boss 20 rises, the said boss fitting between the lower ends of the hinges or the lower portions of the meeting edges of the lenses. The bridge is thereby held in proper position to aid in supporting the lenses and to cushion the same on the wearer's nose.

In Fig. 6 I have shown a modified form of the hinge in which the hinge members 21 are secured to the top edges of the lenses instead of the inner meeting ends of the same, the said ends being free of all parts which might obstruct the vision.

It is to be understood that the lenses may be plane glass or they may be given any desired concavity or convexity in order to reduce defects in the vision of the user.

Having thus described my invention, what I claim is:

1. The combination with a pair of lenses, of hinge members secured thereto and pivotally connected and provided with lateral shoulders adapted to impinge upon each other and prevent folding of the lenses.

2. The combination with a pair of lenses, of hinge members, each consisting of a sleeve and lugs projecting from the sleeve and secured to a lens and provided with lateral shoulders near the sleeve and adapted to impinge against each other to limit the movement of the lenses, and a pivot pin inserted through alined sleeves of the hinge members.

3. The combination with a lens, of a reinforcing rim adapted to engage and be secured to the outer edge thereof, outstanding projections on the outer side of the rim, and a hood having its edge secured to said projections.

4. The combination with a lens having perforations near its outer edge, of a rim provided with perforated lugs on its inner side adapted to register with the perforations in the lens and projections on its outer side, a hood secured to said projections, and fastenings inserted through the lugs and the perforations in the lens.

5. The combination with lenses having their lower edges shaped to fit against the nose, of an elastic bridge fitted to said lower edges to rest on the nose.

6. The combination with a pair of lenses hinged together and having their lower edges shaped to present a nose opening, of an elastic bridge secured between the lenses and fitting in the apex of the nose opening.

7. The combination with a pair of lenses hinged together and having their lower edges shaped to present a nose opening, of an elastic cushion fitted to the apex of the nose opening and having a boss adapted to be engaged and held between the hinged ends of the lenses.

In testimony that I claim the foregoing as my own, I have hereto affixed my signature in the presence of two witnesses.

CARROLL E. COOK.

Witnesses:
V. Z. BRENEMON,
A. J. ANDREWS.